United States Patent
Lockhart et al.

(10) Patent No.: US 6,863,482 B2
(45) Date of Patent: Mar. 8, 2005

(54) CARGO RETENTION SYSTEM

(76) Inventors: Fred Lockhart, 1757 Grovewood Dr., Clayton, NC (US) 27520; Brad Lockhart, 1702 Dorchester Dr., Albany, GA (US) 31707

( * ) Notice: Subject to any disclaimer, the term of this patent is extended or adjusted under 35 U.S.C. 154(b) by 0 days.

(21) Appl. No.: 10/462,258

(22) Filed: Jun. 16, 2003

(65) Prior Publication Data

US 2004/0253072 A1 Dec. 16, 2004

(51) Int. Cl.[7] .............................. B61O 45/00; B60P 7/00
(52) U.S. Cl. ..................................... 410/97; 226/100.15
(58) Field of Search .............................. 410/32, 34, 96, 410/97, 117, 118, 36, 37, 42, 121, 156; 224/403, 534, 318, 328, 329; 296/50, 37.1, 100.11, 100.13, 100.16, 100.15; 280/72.9; 24/712, 713, 713.2, 713.3, 713.4, 713.6, 714.6

(56) References Cited

U.S. PATENT DOCUMENTS

| | | | |
|---|---|---|---|
| 2,866,248 A | 12/1958 | Reno | |
| 3,897,919 A | 8/1975 | Weingarten | |
| 4,751,493 A * | 6/1988 | Miller | 340/467 |
| 5,011,349 A | 4/1991 | McAndrews | |
| 5,121,958 A | 6/1992 | Goeden et al. | |
| 5,236,347 A | 8/1993 | Andrus | |
| 5,328,310 A * | 7/1994 | Lockney | 410/97 |
| 5,351,827 A | 10/1994 | Baka | |
| 5,440,790 A * | 8/1995 | Chou | 24/302 |
| 5,452,973 A | 9/1995 | Arvin | |
| 5,516,244 A * | 5/1996 | Baka | 410/36 |
| 5,678,882 A | 10/1997 | Hammond | |
| 5,772,370 A | 6/1998 | Moore | |
| 5,803,391 A | 9/1998 | Saperstein et al. | |
| 5,876,167 A * | 3/1999 | Selby | 410/97 |
| 5,915,899 A | 6/1999 | Dennis | |
| 5,924,611 A | 7/1999 | Mizuno | |
| 6,017,174 A * | 1/2000 | Ross et al. | 410/97 |
| 6,099,222 A | 8/2000 | Moore | |
| 6,152,664 A * | 11/2000 | Dew et al. | 410/100 |
| 6,164,883 A | 12/2000 | Wilcox | |
| 6,183,177 B1 | 2/2001 | Dahlgren | |
| 6,257,637 B1 | 7/2001 | Reed | |
| 6,626,620 B1 * | 9/2003 | Veal | 410/36 |
| 2003/0161699 A1 * | 8/2003 | Austin | 410/97 |

FOREIGN PATENT DOCUMENTS

JP              404002534 A  *  1/1929  ................. 410/97

* cited by examiner

*Primary Examiner*—D. Glenn Dayoan
*Assistant Examiner*—H Gutman
(74) *Attorney, Agent, or Firm*—Coats & Bennett, P.L.L.C.

(57) ABSTRACT

A cargo retention system comprises a lattice having a plurality of generally radially oriented ribs, and optionally a perimeter, with an overlying mesh web. Two anchoring strap networks connect to the lattice at one end of the network, and each network includes, at the other end, a single adjustable strap operative to be removably attached to a vehicle. The cargo retention system is operative to retain a variety loads extending outwardly from a vehicle, and may support loads from dragging the ground by applying a vertical component of force. A storage pouch attached to the lattice doubles as a safety flag in use, and when inverted contains the system for storage. A safety light optionally attached to the lattice may be battery operated, or attached to the vehicle's trailer light connector.

25 Claims, 5 Drawing Sheets

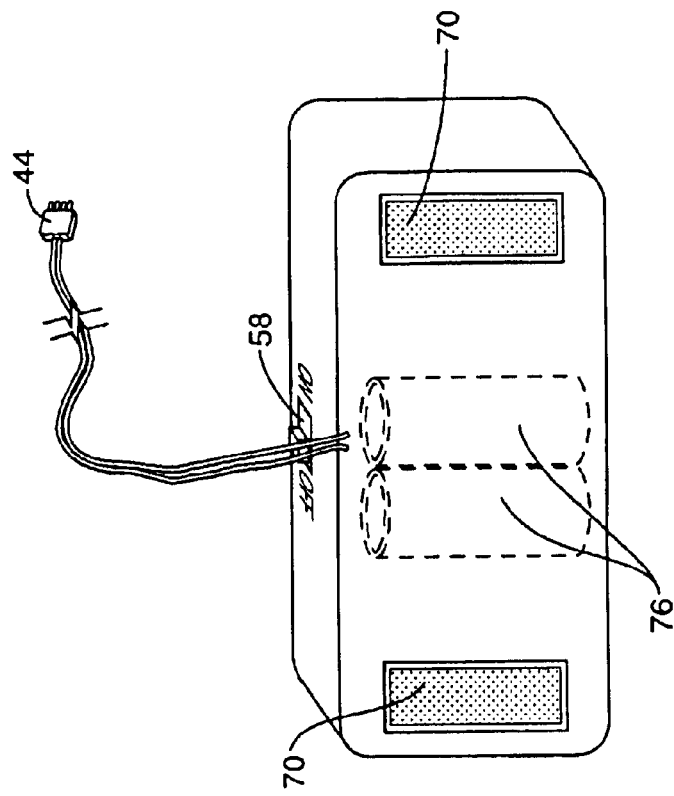
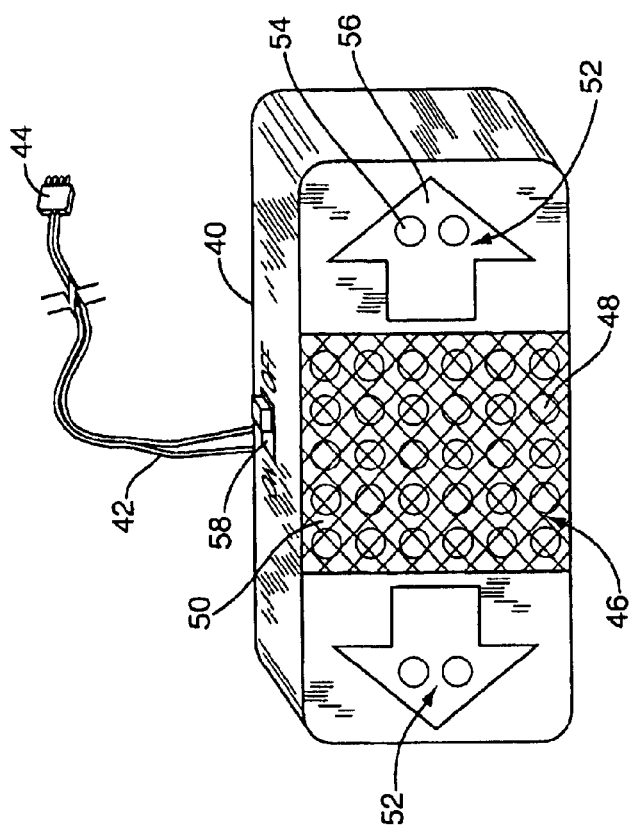
FIG. 4A
FIG. 4B

CARGO RETENTION SYSTEM

BACKGROUND

The present invention relates generally to the field of transportation and in particular to a cargo retention system for vehicles.

The utility of light trucks, such as pickup trucks, sport-utility vehicles (SUV), and the like, is well known. These vehicles are often called upon to carry loads that do not tit entirely within their designed cargo spaces, a problem that additionally affects many automobiles with hatchbacks, trunks, vehicles pulling trailers, and the like. A pickup truck or SUV, for example, with lumber or other material protruding past the lowered tailgate or raised hatchback is a common sight. Ideally, in such cases, the load is firmly secured, such as with rope, twine, or the like. Also, a red flag or similar warning device should be affixed to the far end of the load as a safety measure, to alert other drivers of the extended load and the potential hazard presented thereby. Unfortunately, it is often the case that such extended loads are neither properly secured nor flagged. In fact, damage due to improperly secured cargo falling out of a truck bed represents a major source of loss, which is absorbed by insurance claims in the building industry, and simply written off by the hapless weekend fixer-upper. Additionally, a serious and significant road hazard is presented to other vehicles whenever inadequately secured cargo falls off of a truck or out of an SUV, presenting a risk of personal injury as well as further property damage.

A variety of load retention systems are known in the art. For example, a longitudinally rigidified fabric envelope for securing the end of a bundle of pipes is known. Similarly, it is known to utilize a cargo net, secured to the truck at four corners, to hold cargo in an open pickup truck bed. These prior art solutions present several deficiencies, however. Many of them are optimized for securing a particular type of cargo, with a generally known or predictable size and shape, and hence are a poor choice for a general-purpose load retention system. Additionally, most of the prior art devices require a large plurality of tie-down points, which are often after-market accessories that must be added to the vehicle. These prior art devices are also confusing, with a large number of cables or straps that must be connected and adjusted. Such devices may fail in operation if all of the straps are not tightened and otherwise adjusted in unison. The devices are also bulky and unwieldy, and difficult to store and transport in a stowed condition due to the large number of straps and cables hanging loose. Finally, the prior art devices do not address the safety aspect of flagging the extended load for the benefit of other drivers.

SUMMARY OF THE INVENTION

The present invention relates to a cargo retention system comprising a lattice having a plurality of generally radially oriented ribs and optionally a perimeter, with a mesh web overlying the lattice. Two anchoring strap networks comprising a plurality of straps connect to the lattice at one end, and each includes at the other end a single adjustable strap operative to be removably attached to a vehicle. The cargo retention system is operative to retain a variety of loads extending outwardly from a vehicle, and may support loads from dragging on the ground by applying a vertical component of force. A pouch attached to the lattice doubles as a safety flag in use, and when inverted contains the system for storage. A safety light optionally attached to the lattice may be battery operated, or attached to the vehicle's trailer light connector.

BRIEF DESCRIPTION OF DRAWINGS

FIG. 4A is a perspective view of the front side of a safety light.

FIG. 4B is a perspective view of the back side of a safety light.

DETAILED DESCRIPTION OF THE INVENTION

Figure 1:
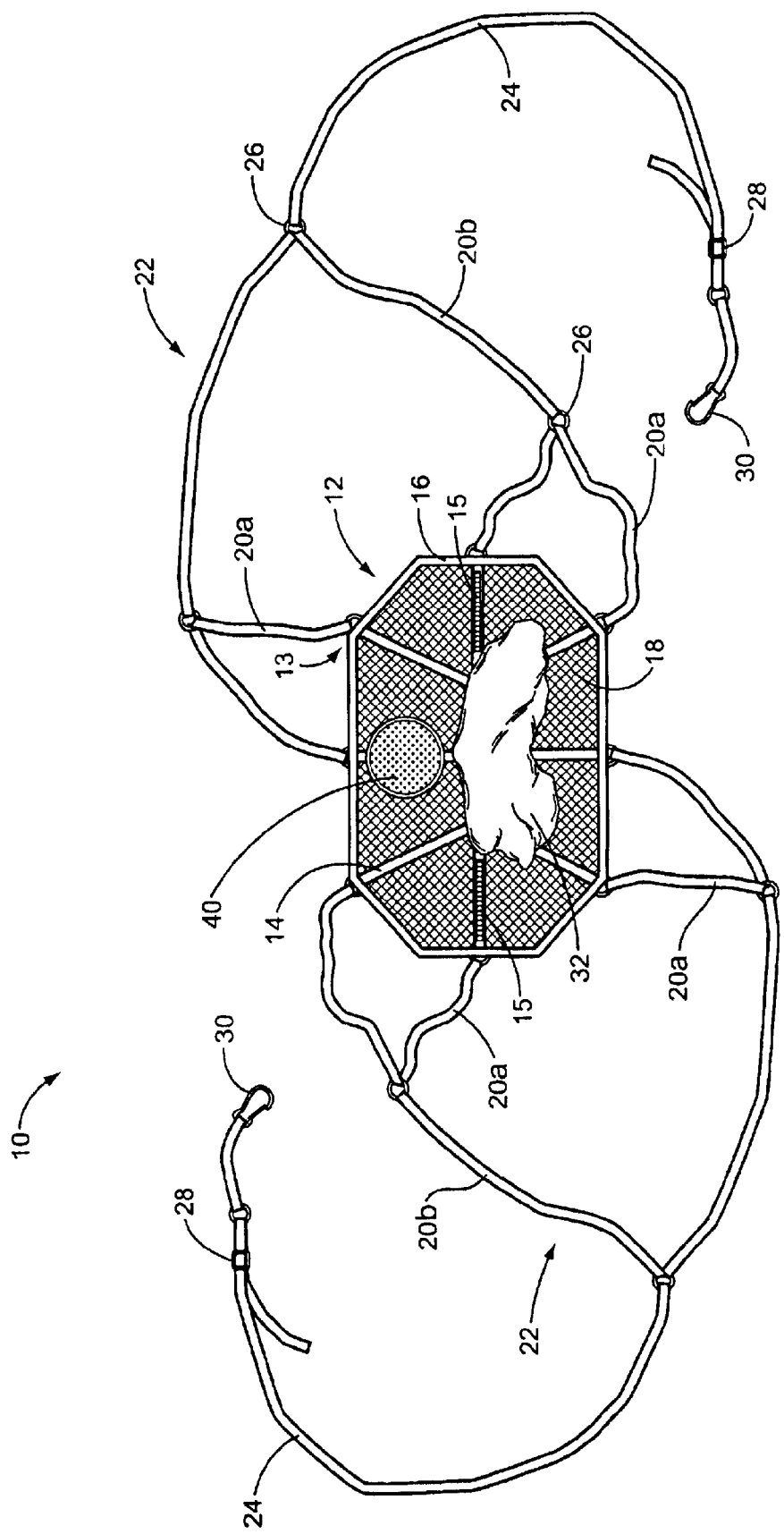
FIG. 1 is a diagram of a cargo retention system in a deployed configuration.

FIG. 1 depicts a cargo retention system according to the present invention, indicated generally at 10. The cargo retention system 10 comprises a net, indicated generally at 12, and an anchoring subsystem that consists of two anchoring strap networks, indicated generally at 22.

The net 12 comprises a flexible lattice, indicated generally at 13, comprising a plurality of generally radially disposed ribs 14, and optionally a perimeter 16. Both the ribs 14 and the perimeter 16 are preferably made of a strong, pliant material such as nylon or polyester webbing used to make industrial slings, motorcycle tie-downs, personnel safety harnesses, and the like. In a preferred embodiment, the lattice 13 is formed from a nylon webbing of at least 2,000 lb. rating. Alternatively the lattice 13 may be formed of rope, cable, chain, or any flexible material capable of sustaining substantial tensile force. Overlying the lattice 13 is a mesh web 18, preferably formed of a nylon mesh with at least a 250 lb. burst strength rating, and which is resistant to tearing. Alternatively, the mesh web 18 could be formed from fabric, continuous plastic, or other suitable material. Mesh is preferred, however, to prevent a "parachute" effect by the net 12 in use. The mesh web 18 prevents cargo, such as individual boards or pipes, from slipping through the voids in the lattice 13, such as between the ribs 14. In one embodiment, the mesh web 18 may comprise or include a fabric or material that exhibits enhanced reflective properties. Additionally, the ribs 14, perimeter 16, and/or mesh web 18 may be sewn together with reflective thread.

Two anchoring strap networks 22, one on either side of the net 12, each comprise a plurality of straps 20a, 20b. Straps 20a, 20b are preferably formed of the same nylon or polyester webbing material used for the construction of the lattice ribs 14. Alternatively, straps 20a, 20b may be formed of nylon or fiber rope, cable, chain, or the like.

Figure 2:
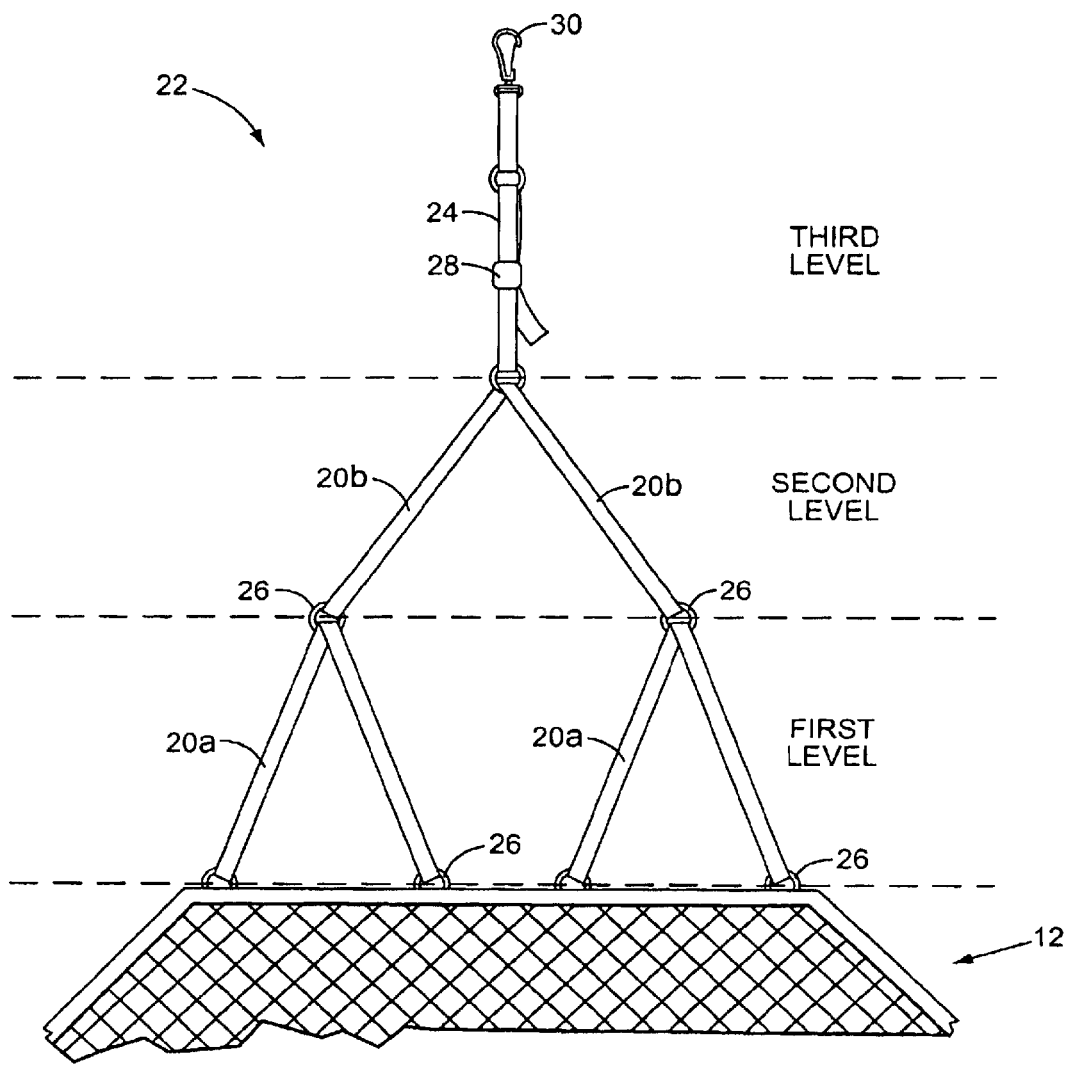
FIG. 2 is a diagram of one anchoring strap network.

As depicted in a representative depiction in FIG. 2, each anchoring strap network 22 comprises a series-connected, multi-level network of straps 20a, 20b. In a first level, at one end of the network 22, a plurality of straps 20a is connected to the net 12. Preferably, each end of each strap 20a connects to the net 12, and the strap 20a passes through a connecting ring 26. The straps 20a connect to the lattice of the net 12, either directly to the ribs 14, or to the perimeter 16. In the latter case, the straps 20a preferably connect to the perimeter 16 at or proximate the intersection of the perimeter 16 and a rib 14. This allows a direct transfer of longitudinal force from the strap 20a to the ribs 14, which form the structural tension-bearing members of the cargo retention system 10. The straps 20a may be sewn directly to the ribs 14 and/or perimeter 16, or may alternatively be connected by rings 26, that are in turn connected to a rib 14 or the perimeter 16.

The second level of the anchoring strap network 22 comprises strap 20b, connected at each end to the rings 26 through which first level straps 20a pass, with the strap 20b itself passing through another ring 26. Second level strap 20b may be of a different length than any of the first level straps 20a. By connecting the different levels of straps 20a, 20b via rings 26, the anchoring strap network 22 may dynamically reconfigure itself according to the size and shape of the cargo being retained, and the tension applied to the network 22. This allows all of the straps 20a, 20b to carry a proportional tension, without one branch of the strap network 22 being relatively overstressed. The connecting rings 26 are preferably of a continuous, i.e., welded type, with a strength rating of at least 2,000 lb. However, any sufficiently strong connector that allows the straps 20a, 20b to slide freely through it may be advantageously utilized. Those of skill in the art will recognize that the ring 26 may be omitted altogether, and its function supplied by simply looping the end of the next-higher level of strap upon itself and securing, such as by stitching, riveting, ultrasonic welding, or the like.

The third level of the anchoring strap network 22 comprises a single adjustable strap 24, connected at one end to the ring 26 through which the second level strap 20b passes. The adjustable strap 24 includes an adjustment mechanism 28, by which the length of the adjustable strap 24 may be altered. Adjustment mechanism 28 may comprise a frictional cam buckle, as used for example in motorcycle tie-down straps. Preferably, the adjustment mechanism 28 is a cam buckle having a strength rating of at least 2,000 lbs. Alternatively, adjustment mechanism 28 may comprise a ratchet mechanism, or any suitable length-adjusting system known in the art. Each adjustable strap 24 preferably terminates in a hooking mechanism 30. Hooking mechanism 30 is preferably a carabiner, but may comprise any suitable hook as well known in the art, including a self-closing snap hook with a spring-loaded release panel, a chain hook, an S-hook, or the like.

In a preferred embodiment, as depicted in FIG. 2, the anchoring strap network 22 has a binary tree configuration. That is, at each successive level of the network 22, beginning with the adjustable strap 24, the number of strap connections to succeeding network levels, or to the net 12, doubles. FIG. 2 depicts a 1-2-4 configuration. In another embodiment, for example, one with a larger net 12, the anchoring strap network 22 may include four levels, and present a 1-2-4-8 configuration, with four straps 20a connecting to the net 12 at eight points. Other configurations and numbers of levels are possible within the broad practice of the present invention, and the specific depictions and descriptions of the anchoring strap network 22 herein are illustrious and not limiting.

In one embodiment of the present invention, each of the two anchoring strap networks 22 are constructed of strap material that is a different color than the other. For example, one anchoring strap network 22 may be red and the other blue (although any colors may be used). Alternatively, the adjustable straps 24 may be distinct colors from each other, with all of the other straps 20a, 20b in the anchoring strap networks 22 being a third color, such as yellow. As another alternative, the color differentiation may occur at any of the levels of anchoring strap network 22 as depicted in FIG. 2. The different colors contribute to ease of use of the cargo retention system 10, which may present a confused jumble of straps when initially removed from storage, particularly if not folded carefully prior to storage. By quickly identifying the two anchoring strap networks 22, and positioning them to either side of the cargo to be secured, the entire cargo retention system 10 is laid open and its use and operation become intuitively clear.

Figure 3:
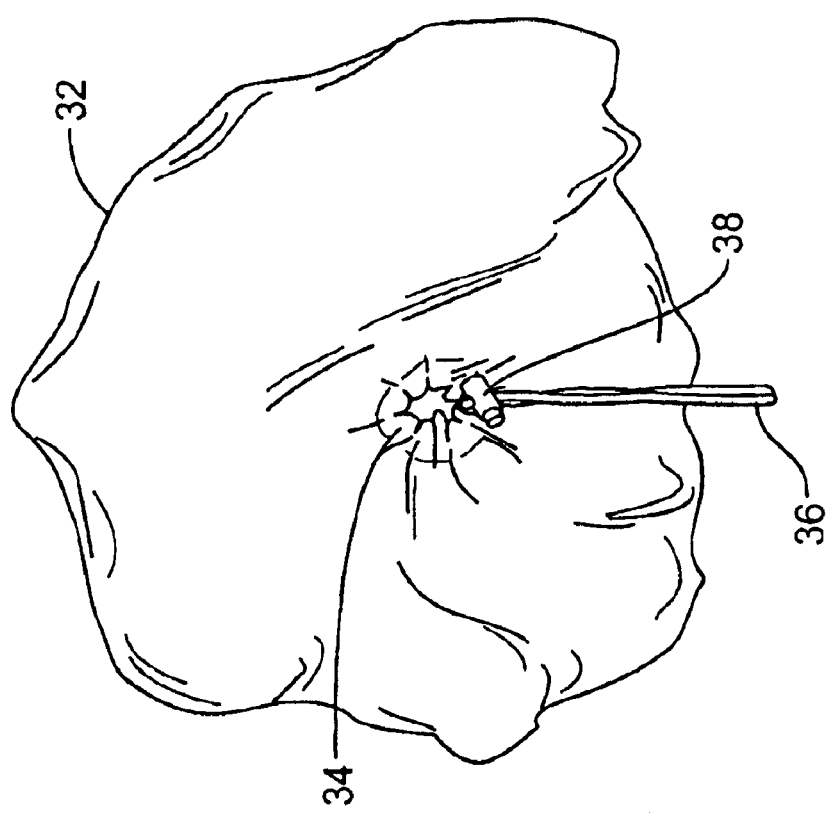
FIG. 3 is a perspective view of a cargo retention system in a stowed configuration, within an attached pouch.

FIG. 1 depicts the cargo retention system 10 in a deployed configuration, such as just prior to using it to secure an extended load in a vehicle. A pouch 32 is secured to the net 12 on the exterior side thereof. FIG. 3 depicts the pouch 32, which contains the cargo retention system 10 in a stowed configuration. The pouch 32 may be of any suitable shape and size, and includes an opening 34. The opening 34 may secured in a closed position, such as by a drawstring 36 and tension button 38. Alternatively, any of a broad array of hooks, straps, hook-and-loop fasteners, or the like, may be used to secure the pouch opening 34 in a closed position. The pouch 32 is secured to the net 12 opposite the opening 34. The cargo retention system 10 is transitioned between stowed and deployed configurations by inverting the pouch 32, or turning it "inside-out." As used herein, the term "invert" and its variants refers to the process of turning the pouch 32 "inside-out" through its opening 34, such that the inner surface and the outer surface of the pouch 32 reverse their state with respect to each other (i.e., the inner surface becoming the outer surface, and vise versa).

In the deployed configuration, the pouch 32, attached to the exterior side of the net 12, functions as a safety flag to warn other drivers of the extended cargo. In a preferred embodiment, at least the "flag" surface of the pouch/flag 32 is red, and at least 12"×12" in extent, thus being suitable as a warning flag for any load extended four feet or more from the vehicle, as may be required by relevant traffic regulations, such as 49 CFR § 393.87 (2003) or the like.

In another embodiment, at least the "inner" surface of the pouch/flag 32 when the cargo retention system 10 is in the stowed configuration of FIG. 2—which is the "outer" surface when in the deployed configuration of FIG. 1—is a safety color such as red, orange, yellow, or lime green. In one embodiment, the pouch 32 is a fluorescent safety color for maximum visibility. Fluorescent colors exhibit a photoluminescence caused by the absorption of ultraviolet radiation (and shorter visible wavelengths), which is then emitted as longer wavelengths within the visible spectrum. This additional photonic energy emission gives the color a highly visible intensity. Fluorescent colors and pigments are well known in the art, and are available, for example, from the Day-Glo Color Corp. of Cleveland, Ohio.

Following its use, the cargo retention system 10 may be folded, and the pouch 32 inverted, or turned "inside-out," over the cargo retention system 10, thus retaining it therein. The opening 34 may then be closed and secured, such as by drawstring 36. The pouch 32 may be formed from nylon or vinyl mesh, fabric, plastic, or any suitable material. Either or both surfaces (i.e., inner and outer surfaces) of the flag/pouch 32 may advantageously serve as mounting points for a brand name or logo, use instructions, care instructions, safety warnings, maximum safe load specifications, or other messages, as appropriate or desired.

FIG. 1 also depicts a photonic safety device 40, optionally attached to the net 12. In one embodiment, as depicted in FIG. 1, the photonic safety device 40 may comprise a passive retroreflector—a unit that directs a significant portion of incident light back in the same direction from which it emanates. In this case, the reflector 40 may comprise a discrete plastic reflector, such as is commonly attached to bicycles and the like. Alternatively or additionally, the reflector 40 may comprise a retroreflective tape or fabric, such as the SCOTCHLITE™ products from the 3M Corporation of St. Paul, Minn., or REFLEXITE® tape products from Reflexite, Inc. of Avon, Conn. Such reflective tape 15 may be applied to a small area, as depicted in FIG. 1, or may alternatively be extensively applied over some or all of the surface of the net 12. Additionally, reflective tape 15 may be applied over the surface(s) of pouch/flag 32 that are visible when used as a safety flag. Reflective tape 15 may additionally be applied to any or all of the straps 20 in the anchoring strap networks 22.

In another embodiment, the photonic safety device 40 comprises a small, self-contained, battery-powered safety light, which generates and emits light from one or more bulbs, LEDs, or other sources. The safety light 40 preferably blinks or flashes periodically. The safety light 40 includes an on/off switch 58 (see FIG. 4A), to preserve battery power when the cargo retention system 10 is not in use (such as, for example, when stowed in the attached pouch 32).

In yet another embodiment, the safety light 40 includes a wiring harness 42 extending therefrom, terminating in a connector 44. The connector 44 is preferably a flat, multi-conductor, keyed connector of the type commonly used to connect the lights of a trailer to a vehicle. The wiring harness 42 is preferably at least as long as the maximum extent of the strap networks 22, facilitating the use of the safety light 40 with the longest of loads. One embodiment of the safety light 40 is depicted in greater detail in FIG. 4A.

In this embodiment, the safety light 40 includes at least a brake light 46. Brake light 46 comprises at least one bulb or LED 48, and preferably comprises an array of LEDs 48. The LEDs 48 may emit red light, or alternatively the bulb(s) or LEDs 48 may be positioned behind a red lens 50, such that the brake light 46 emits a red light. The brake light 46, powered by the vehicle via the connector 44 and wiring harness 42, illuminates whenever the vehicle's brake lights are illuminated, and with the same relative intensity, i.e., with a low intensity when the vehicle's headlights or parking lights are on, and with a high intensity when the vehicle's brakes are applied or the emergency flashers are engaged.

The safety light 40 may additionally include twin directional indicators 52. Directional indicators 52 include lights or LEDs 54, preferably behind an orange, yellow or amber lens 56. The lens 56 is preferably shaped, or partially occluded with an opaque mask, such that a directional icon or other indicia is visible when the respective directional indicator 52 is illuminated. The directional indicators 52 illuminate whenever the vehicle's directional indicators are illuminated, i.e., when the turn signal is activated, and in some vehicles when the emergency flasher is activated. Both the brake light 46 and the directional indicators 52 are powered by the vehicle through wiring harness 42. Additionally, the safety light 40 may include a battery 76 to illuminate brake light 46 in a continuous or flashing manner, for use with vehicles that lack a trailer light connector compatible with connector 44. In this case, the safety light 40 would include an on/off switch 58. FIG. 4B depicts the back side of the photonic safety device 40 of FIG. 4A.

In all embodiments, the photonic safety device 40 is optional, and may be attached to the net 12 in a removable fashion, such as by hook and loop fastener 70, snaps, or other suitable removable fasteners as known in the art. Making the photonic safety device 40 removable facilitates the use of the cargo retention system 10 to secure a wide variety of cargos. For example, when used to secure only a few boards or pipes, the net 12 may "wrap around" the end of the cargo, and present insufficient flat area to which to attach the photonic safety device 40 in an orientation visible to other drivers. On the other hand, when used to secure a stack of plywood or drywall, the net 12 may present a sufficiently flat surface area to mount the photonic safety device 40 in a position and orientation to be readily seen by other drivers, increasing the vehicle's safety while transporting the cargo.

Figure 5:
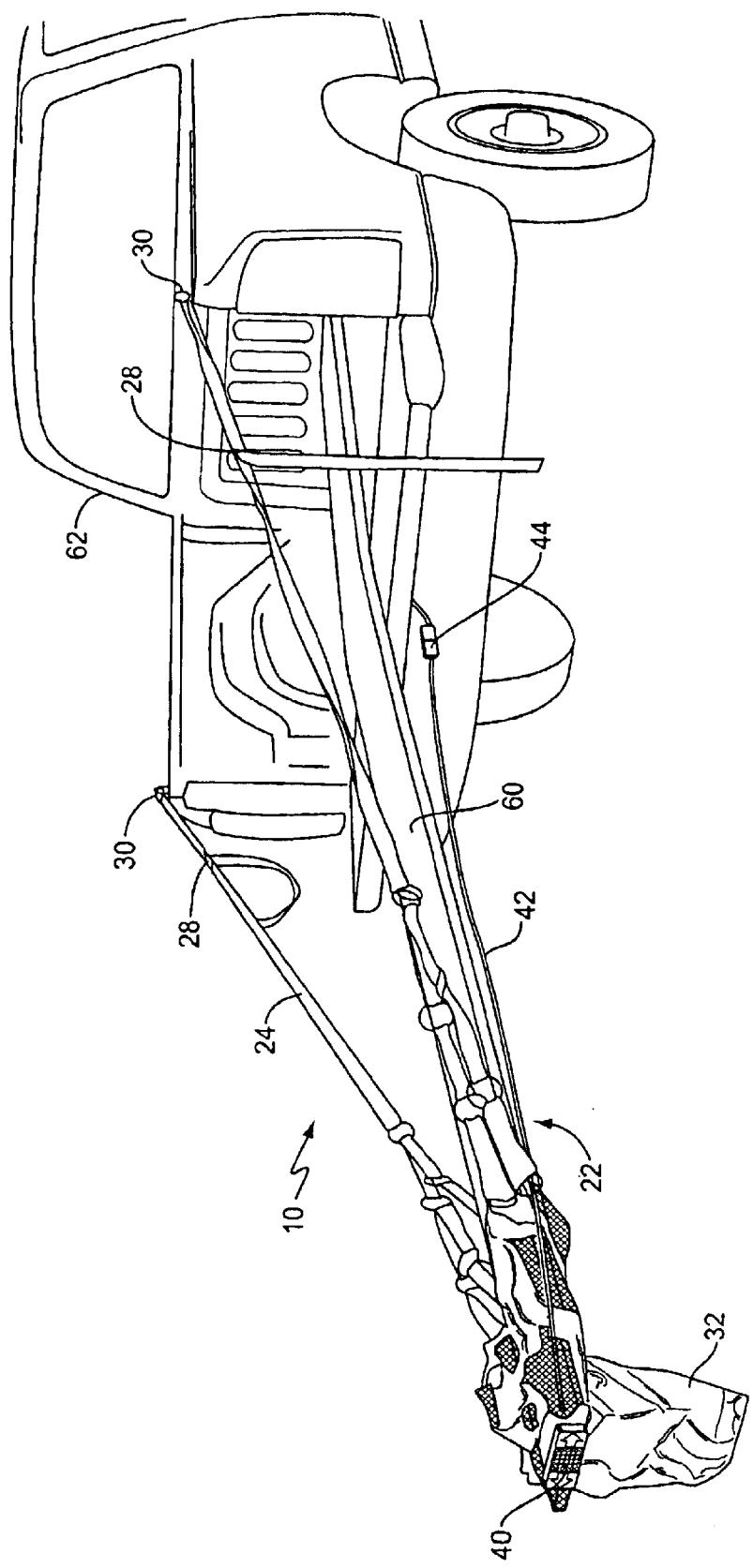
FIG. 5 is a perspective view of the cargo retention system deployed to secure a load of lumber in a pickup truck.

FIG. 5 depicts the cargo retention system 10 in use, securing, in this example, a board 60 extending from the open bed of a pickup truck 62. The configuration of the truck 62 is representative only. In many cases, the cargo retention system 10 of the present invention may secure loads extending over the closed tailgate of truck 62. The cargo retention system 10 is first unpacked from its stowed position of FIG. 3, by opening the pouch 32, turning it inside-out, and unfolding the cargo retention system 10. The net 12 is centered on the furthermost end of the extended cargo 60, ensuring that the safety light 40 and pouch 32 are on the opposite side of the net 12 from the cargo 60, and the hook mechanisms 30 at the end of each anchoring strap network 22 are attached to a convenient, secure mounting point on the vehicle 62.

As discussed above, making at least part of the anchoring strap networks 22 each a unique color greatly simplifies the installation and use of the cargo retention system 10. Additionally, as a user becomes familiar with the cargo retention system 10 of the present invention, he or she may remember that, for example, the red anchoring strap network 22 attaches to the starboard side of the vehicle 62. This automatically ensures that the net 12 is properly oriented, with the safety light 40 and pouch/flag 32 facing outwardly. The two adjustable straps 24 are then tightened via adjustment mechanisms 28. The safety light 40 is connected to the vehicle's trailer light via connector 44, and the operation of the safety light 40 visually confirmed, such as by activating the vehicle's turn signals and/or brake lights. The pouch/flag 32, in an inverted or "inside-out" position from that used to store the cargo retention system 10, is left to flutter visibly at the furthermost end of the extended cargo 60, as a safety flag. The entire process is quick and easy, and provides positive support and retention force to the cargo 60 during transport.

Upon reaching the destination, the cargo retention system 10 is easily removed by releasing tension in the anchoring strap network 22 by actuating the adjusting mechanism 28. The adjustable straps 24 are then removed from the vehicle 62 by disengaging the hooking mechanism 30. The safety light connector 44 is unconnected from the vehicle 62, and the entire cargo retention system 10 is removed from the cargo 60. The cargo retention system 10 may then be folded, if desired. Additionally, by clipping the hooking mechanisms 30 to a convenient point proximate the net 12 (for example, to a ring 26 or one of the straps 20a, 20b), tangling of the straps 20a, 20b is greatly reduced, simplifying deployment of the cargo retention system 10 upon its next use. The pouch/flag 32 is inverted "inside-out" over the cargo retention system 10, containing it therein. The pouch opening 34 is closed, such as by drawstring 36, and secured, such as via friction button 38.

Because the end of at least one strap 20a, 20b, and in a preferred embodiment, three strap ends (see FIG. 1) attach to the net 12 at the upper side thereof, the cargo retention system 10 may exert a vertical component of force on the retained cargo 60, effectively "picking it up" off the ground and holding it in a suspended position. This is particularly important, for example, when transporting cementious composite boards (used for siding, decking, and the like), which have a pronounced tendency to bend when cantilevered past a rigid vertical support. Such boards often bend to the point of scraping the ground when extended out past the open bed of a pickup truck. By use of the cargo retention system 10 of the present invention, these boards are supported off the ground during transit, reducing damage.

Because of the anchoring strap networks 22 of the present invention, and in particular the manner in which straps 20a, 20b in successive levels of the network 22 connect via rings 26 (or other slideable device or configuration, such as a loop in the strap itself), the cargo retention system 10 automatically adjusts itself such that the retaining force is applied substantially evenly to all ribs 14 of the lattice of net 12. This self-adjustment is independent of the size or shape of the cargo 60 being secured. The cargo retention system 10 is thus highly versatile. For example, it is equally effective securing a canoe or kayak to a vehicle 62 as a load of lumber, pipes, plywood, or other cargo 60. Additionally, because the anchoring strap networks 22 attach to the vehicle 62 via only two hook mechanisms 30, the cargo retention system 10 may be used in virtually any vehicle 62, and secures cargo extending from the open hatchback of an SUV or from the trunk of a sedan as well as that extending from the bed of a pickup truck.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A cargo retention system, comprising:
   a flexible lattice comprising a plurality of generally radially disposed ribs;
   an anchoring subsystem consisting of two anchoring strap networks, each comprising a plurality of straps, each said network connected to said lattice at a plurality of points on one end of said network, and including a single adjustable strap operative to be removably attached to a vehicle on the other end of said network; and
   a pouch having an opening, said pouch secured to said lattice opposite said opening, said pouch operative to contain said lattice and said two anchoring strap networks in a stowed configuration when inverted;
   wherein said cargo retention system is configurable between a deployed configuration wherein said lattice and said two anchoring strap networks are external to said pouch and the stowed configuration wherein said lattice and said two anchoring strap networks are disposed in said pouch.

2. The system of claim 1 wherein said pouch is a safety color, and operates as a warning flag when said cargo retention system is in use.

3. The system of claim 2 wherein said safety color is fluorescent.

4. A cargo retention system, comprising:
   a flexible lattice comprising a plurality of generally radially disposed ribs;
   an anchoring subsystem consisting of two anchoring strap networks, each comprising a plurality of straps, each said network connected to said lattice at a plurality of points on one end of said network, and including a single adjustable strap operative to be removably attached to a vehicle on the other end of said network; and
   a photonic safety device secured to said lattice.

5. The system of claim 4 wherein said photonic safety device is removably secured to said lattice.

6. The system of claim 4 wherein said photonic safety device is an optical reflector.

7. The system of claim 6 wherein said optical reflector comprises flexible reflective tape.

8. The system of claim 4 wherein said photonic safety device is a safety light.

9. The system of claim 8 wherein said safety light is operative to flash periodically.

10. The system of claim 9 wherein said safety light is battery powered.

11. The system of claim 8 wherein said safety light is red, and is operative when the vehicle's brakes are applied.

12. The system of claim 11 further comprising two horizontally spaced apart directional signals, each of which is operative when the vehicle's respective turn signal is active.

13. The system of claim 11 further comprising a wire and connector operative to connect said safety light to a vehicle's trailer light connector.

14. A cargo retention system, comprising:
   a flexible lattice comprising a plurality of generally radially disposed ribs; and
   an anchoring subsystem consisting of two anchoring strap networks, each said anchoring strap network consisting essentially of:
      a first plurality of straps connected to said lattice;
      at least one intermediate strap connected to said first plurality of straps; and
      a single adjustable strap connected to said at least one intermediate strap, said adjustable strap operative to be removably attached to a vehicle.

15. The system of claim 14, further comprising a flexible mesh web overlying said lattice and operative to restrain secured cargo from travel through voids in said lattice.

16. The system of claim 14 wherein at least one of said first plurality of straps is connected to said lattice at the upper side thereof when said cargo retention system is in a deployed configuration, such that said cargo retention system is operative to exert a vertical component of force on the secured cargo.

17. The system of claim 14 wherein straps selected from the group consisting of said first plurality of straps, said intermediate straps, and said adjustable strap are different colors in each of said two anchoring strap networks.

18. The system of claim 14 wherein each said adjustable strap includes a hooking mechanism for attachment to the vehicle.

19. The system of claim 14 further comprising a pouch having an opening, said pouch secured to said lattice opposite said opening, said pouch operative to contain said lattice and said two anchoring strap networks in a stowed configuration when inverted.

20. The system of claim 19 wherein said pouch is a safety color, and operates as a warning flag when said cargo retention system is in use.

21. The system of claim 14 further comprising an optical reflector secured to said coarse mesh web.

22. The system of claim 14 further comprising a safety light removably secured to said coarse mesh web.

23. The system of claim 22 wherein said safety light is operative to flash periodically.

24. The system of claim 14 wherein said safety light is red, and is operative when the vehicle's brakes are applied.

25. A cargo retention system, comprising:
   a flexible lattice comprising a plurality of generally radially disposed ribs;
   a photonic safety device removably secured to said coarse mesh web;
   an anchoring subsystem consisting of two anchoring strap networks, each comprising a plurality of straps, each said network connected to said lattice at a plurality of points on one end of said network, and including a single adjustable strap operative to be removably attached to a vehicle on the other end of said network; and
   a pouch having an opening, said pouch secured to said lattice opposite said opening, said pouch operative to contain said lattice and said two anchoring strap networks in a stowed configuration when inverted;
   wherein said cargo retention system is configurable between a deployed configuration wherein said lattice and said two anchoring strap networks are external to said pouch, and a stowed configuration wherein said lattice and said two anchoring strap networks are disposed in said pouch.

* * * * *